UNITED STATES PATENT OFFICE.

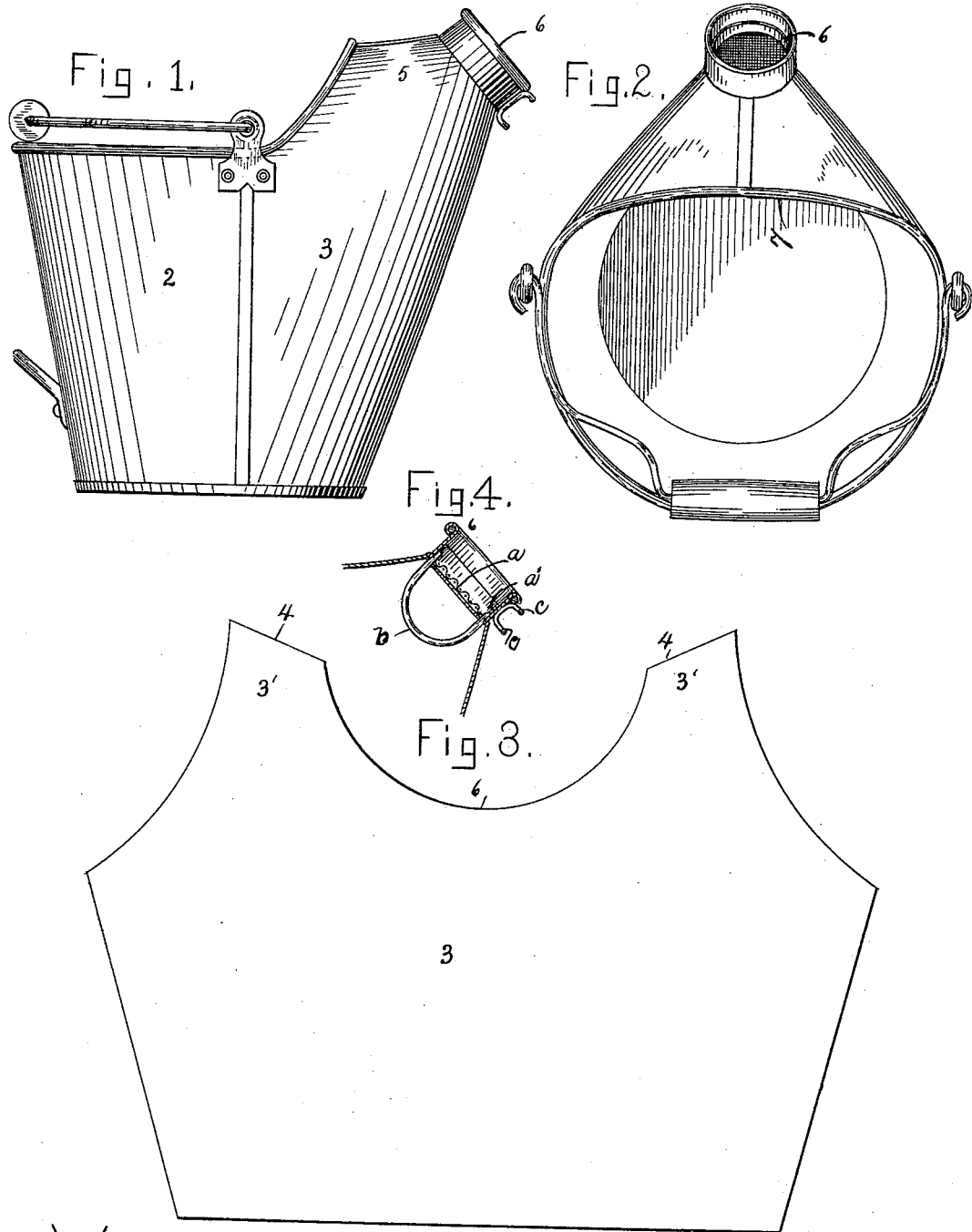

CHARLES G. MANLEY, OF BROCKTON, MASSACHUSETTS.

MILK-PAIL.

SPECIFICATION forming part of Letters Patent No. 329,467, dated November 3, 1885.

Application filed March 23, 1885. Serial No. 159,774. (No model.)

*To all whom it may concern:*

Be it known that I, CHARLES G. MANLEY, of Brockton, in the county of Plymouth and State of Massachusetts, have invented certain Improvements in Milk-Pails, of which the following is a specification.

My invention relates to milk-pails; and it consists in the improvements hereinafter described and set forth.

Of the accompanying drawings, forming a part of this specification, Figure 1 represents a side view of my improved pail. Fig. 2 represents a top view. Fig. 3 represents a view of the piece of which the front of the pail and the conical breast or funnel are made. Fig. 4 represents a sectional view of the breast or funnel and its discharge-opening and strainer.

The same letters of reference indicate the same parts in all the figures.

I make the body of a sheet-metal pail of two sheets, 2 and 3, united by vertical seams or joints at the sides of the pail in the usual manner. The sheet 2, constituting the rear half, of the body of the pail, is of the usual form; but the sheet 3, constituting the front half, is provided with the prongs $3'\ 3'$, extended upwardly, as shown in Fig. 3, and so formed that when curved inwardly and united along the diagonal inwardly-inclining edges 4 4 they will form a conical breast or funnel, 5, having a discharge-opening, 6, which is preferably extended by a narrow ring or spout soldered to the margin of the opening in the breast. It will be seen that there are no seams or joints connecting the front portion of the body of the pail and the breast; hence the surfaces of said front and breast are smooth and devoid of recesses or seams, excepting at the top of the breast, where a short seam, 7, is formed by the union of the edges 4 4. Said surfaces can therefore be easily cleaned, there being no opportunity for the lodgment of milk or other matter upon them.

By forming the front and breast in one piece I make the construction of the pail less expensive than it would be if the front and breast were made separately.

$a$ represents a strainer, composed of a circular piece of gauze or other foraminous material, having a marginal circular flange, $a'$, adapted to be inserted in the discharge-opening 6 from the inside of the pail, so that the pressure of the milk flowing from the pail against the strainer will keep the latter in place, the ring $a'$ being longer than the discharge-opening, so that the pressure of the milk cannot force it through said opening. I am thus enabled to dispense with screw-threads and other devices for positively securing the strainer, which are required when it is applied externally to the discharge-spout of a pail. The strainer has a bail or handle, $b$, which projects inwardly, as shown in Fig. 4, so that the strainer may be readily applied and removed.

$c\ c$ represent outwardly-projecting lugs on the lower portion of the discharge-spout. Said lugs are formed to engage with the edge of a milk-can or other receptacle, and thus keep the pail in engagement with the can while milk is being poured from it into the can. One lug may be employed, instead of two, if desired.

I am aware of the constructions disclosed in the patent of one McKusick, No. 180,254, dated July 26, 1876; and to one Oliver, No. 165,858, dated July 20, 1875, and I do not therefore claim, broadly, any feature set forth in said patents.

I claim—

The combination, in a milk-pail, with the funnel thereof, of a strainer inserted in said funnel from the inner side thereof, and comprising a circular piece of gauze or other foraminous material, having the projecting circumferential flange, the looped handle $b$, secured to said flange and projecting downwardly, said handle being arranged on the inner side of the strainer, and the lugs on the spout, substantially as set forth.

In testimony whereof I have signed my name to this specification, in the presence of two subscribing witnesses, this 19th day of March, 1885.

CHARLES G. MANLEY.

Witnesses:
C. F. BROWN,
A. L. WHITE.